United States Patent [19]

Capelle et al.

[11] 4,272,566
[45] Jun. 9, 1981

[54] SUSPENSION AGENT FOR SYNTHETIC RESIN POWDERS

[75] Inventors: Anton Capelle, Delden, Netherlands; Heinz Scholten, Haltern, Fed. Rep. of Germany

[73] Assignee: Chemische Werke Hüls AG, Marl, Fed. Rep. of Germany

[21] Appl. No.: 144,888

[22] Filed: Apr. 29, 1980

Related U.S. Application Data

[60] Division of Ser. No. 6,874, Jan. 26, 1978, Pat. No. 4,237,040, which is a continuation of Ser. No. 658,579, Feb. 17, 1976, abandoned.

[30] Foreign Application Priority Data

Feb. 21, 1975 [DE] Fed. Rep. of Germany ....... 2507504

[51] Int. Cl.$^3$ .............................................. B05D 5/10
[52] U.S. Cl. ................................ 427/208.2; 427/288
[58] Field of Search ............................. 427/208.2, 288

[56] References Cited

FOREIGN PATENT DOCUMENTS 2007971 12/1971 Fed. Rep. of Germany .
2229308 1/1974 Fed. Rep. of Germany .

Primary Examiner—Bernard D. Pianalto
Attorney, Agent, or Firm—Gilbert L. Wells

[57] ABSTRACT

Method of spot coating garment interlinings comprising a suspension agent for synthetic resin powders comprising an aqueous emulsion wherein there is contained, in a concentration of about 1-7.5 percent by weight:

(A) a mixture of about 95-40 molar percent of an aminoamide of the general formula

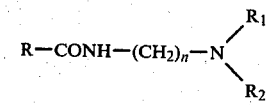

wherein
R represents a saturated or unsaturated hydrocarbon group having 18-19 carbon atoms,
n represents an integer of between 2 and 6, and
$R_1$ and $R_2$ represent alkyl groups having 1-3 carbon atoms; and (B) about 5-60 molar percent of a fatty acid or mineral acid salt of this aminoamide.

12 Claims, No Drawings

SUSPENSION AGENT FOR SYNTHETIC RESIN POWDERS

This is a division of application Ser. No. 006,874, filed Jan. 26, 1979 now U.S. Pat. No. 4,237,040 which in turn is a continuation of application Ser. No. 658,579 filed Feb. 17, 1976, now abandoned.

CROSS REFERENCES TO RELATED APPLICATIONS

Applicants claim priority under 35 U.S.C. 119 for Application P 25 07 504.1-43, filed Feb. 21, 1975 in the Patent Office of the Federal Republic of Germany.

The disclosure of applicants' copending Application Serial No. 617,440, filed Sept. 29, 1975, now U.S. Pat. No. 4,046,747 is incorporated herein to show the state of the art of the aminoamides and copolyamides used in the present invention.

BACKGROUND OF THE INVENTION

The field of the invention is suspension agents for synethetic resin powders and the invention is particularly concerned with suspension agents for synthetic resin powders used in the spot coating of interlings for garments.

The state of the art of suspension agents useful for the preparation of printing pastes to be applied in spots to interlinings for garments may be ascertained by reference to Italian Pat. No. 301,283; West German Applications Nos. 2,007,971 published Dec. 16, 1971 and 2,229,308; published Jan. 3, 1974 and British Patent 1,295,558, the disclosures of which are incorporated herein.

According to British Pat. No. 1,295,558, which corresponds to German Published Application No. 2,007,971, the spot coating of interlinings is carried out mainly by three methods:

1. A suitable plastic powder, for example, a polyamide or polyethylene based powder, is applied by a doctor blade to an engraving roller having recesses in the form of dots disposed in an even raster or grid formation and having a diameter of about 1 mm so that the plastic powder fills the recesses. The web of the interlining, which has been preheated to a high temperature by means of heating rollers, is passed around the engraving roller under tension and the plastics powder is transferred from the recesses to the web of interlining material.

2. A network of spots of a suitable plastics, such as polyethylene, is prepared in the form of a raster, the spots being interconnected by very fine webs. The network is applied dry to the hot interlining, the fine webs breaking up and disappearing, and the spots of the plastic fusing to the interlining. Interlinings of this kind have a relatively hard handle and can be fixed only on relatively heavy facing materials and the plastics also tend to bleed through and stick to the fixing press.

3. In the least complex process, suitable plastics, such as PVC, polyamide or polyethylene, are mixed with plasticizers or in aqueous or solvent-containing media to form pastes which are printed by means of a printing roller formed with perforations arranged as a raster.

It is known to use aqueous solutions of the ammonium salts of polymeric organic acids as suspension agents and/or dispersants as disclosed in Italian Pat. No. 301,282. Improvements in the state of the art of these suspension agents are described in German Published Application Nos. 2,007,971 and 2,229,308, and British Pat. No. 1,295,558. Preferably, the salts of the polymers or copolymers of acrylic acid are used. Dispersions prepared with the air of these suspensions agents, which are also called pastes, have, however, not been foound to be fully satisfactory.

When these pastes are dried after the imprinting step, the suspension agents form a thin, but hard skin on the surface of the synthetic resin spots. When this phenomenon is not compensated for by the addition of suitable plasticizers, high heat sealing temperatures or pressures are required to attain satisfactory adhesion of the thus coated fabric to the covering materials. However, high concentrations of plasticizers, which prevent this troublesome effect, lead to poor stability of the bond with respect to super-heated steam, as is employed for example during steam ironing. Moreover, the structure of the interlining and the covering material has imparted thereto a rough handle due to the use of the salts of polymeric fatty acids and this indicates that a foreign substance has been incorporated between the actually soft fabrics and it is not necessary to be an expert to notice this.

SUMMARY OF THE INVENTION

It is, therefore, an object of the present invention to provide a suspension agent lacking the disadvantages of the prior art.

This object is achieved by providing a suspension agent for synthetic resin powders for the spot coating of interlinings for garments comprising an aqueous emulsion containing, in a concentration of about 1-7.5 percent by weight:

(A) about 95-40 molar percent of an aminoamide of the general formula

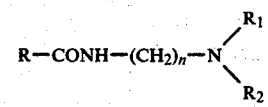

wherein

R represents a saturated or unsaturated aliphatic hydrocarbon group of 13-19 carbon atoms, n represents an integer between 2 and 6, and $R_1$ and $R_2$ represent alkyl groups of 1-3 carbon atoms; and (B) about 5-60 molar percent of a fatty acid or mineral acid salt of this aminoamide. Preferably, the aforementioned components are contained in the aqueous emulsion in a concentration of about 2-5 percent by weight.

DESCRIPTION OF THE PREFERRED EMBODIMENTS

Suitable salts of the aminoamide are those of fatty acids, such as of formic acid, acetic acid, propionic acid, or the homologs thereof, or those of mineral acids, such as hydrochloric acid, sulfuric acid, and phosphoric acid, and the acetic acid salts are preferably used.

The aminoamide is obtained conventionally by the condensation of long chain, saturated or unsaturated fatty acids, such as palmitic acid, stearic acid, oleic acid, or other fatty acids having more than 10 carbon atoms, or mixtures of several of such acids, preferably stearic acid and palmitio acid, especially also by the use of the mixture of fatty acids present in vegetable oils, such as tall oil, linseed oil, with an N,N-dialkyldiamine, such as N,N-dimethyl-1,3-diaminopropane, N,N-dimethyl-1,4-diaminobutane, and N,N-dimethyl-1,6-diaminohexane. N,N-dimethyl-1,3-diaminopropane is preferably used.

The suspension agent of the present invention permits a substantially broader applicability for the preparation of the pastes, by varying the quantitative ratios of the aminoamide and the salt of the aminoamide.

When an aqueous emulsion of the indicated concentration is employed wherein the aminoamide is contained in amounts of about 95–85 molar percent and the salt of the aminoamide in amounts of about 5–15 molar percent, this aqueous emulsion is suitable without any further additives for the preparation of printable pastes, since this emulsion is thixotrophic. The desired viscosity of the paste is adjusted by varying the proportion of the salt and by the amount of the synthetic resin powder. These variables are determined by a few manual experiments. The amount of the salt is adjusted most simply by adding the corresponding quantity of acid.

With a quantitative ratio of about 40–60 molar percent of aminoamide and 60–40 molar percent of the salt of the aminoamide, likewise thixotropic suspension agents are obtained by the addition of alkyl polyglycol ethers of the general formula

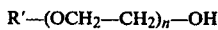

$$R'-(OCH_2-CH_2)_n-OH$$

wherein

R' represents a fatty alcohol group of 14–20 carbon atoms and n represents an integer of between 4 and 10.

The alkyl polyglycol ether is prepared by the reaction of industrial grade fatty alcohols or fatty alcohol mixtures, such as stearyl alcohol, palmitic alcohol, coconut fatty alcohols, tallow fatty alcohols, and the like, with 4–10 moles of ethylene oxide. Preferably used is an industrial grade mixture of stearic and palmitic alkoxylate with 4.5–6 ether groups. The alkyl polyglycol ether is contained in the aqueous emulsion in a concentration of about 4–10, preferably 4–7 percent by weight, and the mixture of the aminoamide and the salt of the aminoamide in amounts of preferably about 3–5 percent by weight.

Advantageously, the quantitative ratios of aminoamide to the salt of the aminoamide mixture are adjusted by neutralization with the corresponding amount of acid, preferably acetic acid.

The aqueous emulsion contains suitably about 2–5 percent by weight of glycerin which is concomitantly employed during the production of the suspension agent from the aforementioned components.

An aqueous emulsion of a suspension agent is especially advantageous which contains:

3–7 percent by weight, preferably 2–5 percent by weight, of a mixture of
40–60 molar percent of the aminoamide,
60–40 molar percent of the fatty acid salt of the aminoamide, and
0.5–3, preferably 0.5–1 percent by weight of hydroxyethylcellulose.

Suitable hydroxyethylcelluloses are those obtained by the reaction of cellulose with 2–3, preferably 2.5 moles of ethylene oxide.

Here again, it is particularly advantageous to use additionally glycerin during the preparation of the aqueous emulsion of the suspension agent, namely in amounts so that 1–10, preferably 3–6 percent by weight, are contained in the suspension agent.

Additionally, in order to adjust the viscosity, it is possible to add, during the preparation of these pastes, further thickeners based upon cellulose, preferably the aforementioned hydroxethylcellulose types.

During the preparation of the various suspension agents, it is of course, likewise possible to use plasticizers, such as toluenesulfonamide, phthalic acid esters or benzoic acid esters, especially benzyl butyl phthalate or dibutyl sulfonamide. These compounds are used in amounts of 5–25 percent by weight, preferably 5–20 percent by weight, based on the synthetic resin powder employed. The use of plasticizers is especially advantageous in connection with polyamide dispersions.

Additional conventional auxiliary agents, such as defrothers, e.g. based upon silicone, or sulfonated diesters, can be used during the production of the suspension agents. Such defrothers are offered by the comerical manufacturers in this field as defrothers for synthetic resin dispersions, the last-mentioned substances, for example, under the trademark "NOPCO".

The suspension agents can also be prepared by completely neutralizing the aminoamide in the presence of water and glycerin and subsequently adding an appropriate amount of aminoamide.

Synthetic resin powders are dispersed in the emulsion of the present invention. Subsequently, the dispersions are adjusted to the desired viscosity by adding a suitable thickener, e.g. the aforementioned pulverulent hydroxyethylcelluloses.

Synthetic resin powders, optionally with the further addition of plasticizers, are incorporated with agitation into the suspension agent, thus obtaining pourable and printable pastes. The synthetic resin powders are contained in the pastes in a proportion of about 25–50, preferably about 30–40 percent by weight.

Suitable synthetic resin powders are polyethylene, especially those produced according to the low pressure or medium pressure methods and having a melt index MFI 160/5 according to German Industrial Standard DIN 53 735 of 20–60 g/10 min. and particularly ternary and quaternary copolymides based upon lauryllactam. In general terms, such copolyamides customarily contain 10–90 molar percent of the groups of aliphatic and optionally cyclic discarboxylic acids of 4–12 carbon atoms, and groups, equivalent thereto, of aliphatic and/or cyclic diamines of 4–15 carbon atoms, wherein the diamine groups are branched; and 90–10 molar percent of one or more groups of ω-aminocarboxylic acids of 4–14 carbon atoms, as well as other synthetic resins present in powder form and usable as hot melt textile adhesives.

Examples are the copolyamides 12/6–6/6; 12/12–6/6; 6/6–6/12–6; 11/6–6/6; 11/6–12/6; 12/11/6–6/6; 12/6–6/6–12/6; and 12/6–6/6–10/6, wherein the amine component in the hezamethyleneadipic acid used and/or decanedicarboxylic acid salt can be partially substituted, for example, by trimethylhexamethylenediamine and/or 1-amino-3-aminometyl-3,5,5-trimethylcyclohexane (isophoronediamine) and the acid component can be partially substituted by other dicarboxylic acids of at least 4 carbon atoms. The melting points of the synthetic resin powders used are at most 140° C., measured by means of differential thermoanalysis.

The pastes prepared with the aid of the suspension agent result, after heat sealing, in bonds of high strength and an especially soft handle.

In this connection, it is especially advantageous that this suspension agent has an adhesion-improving effect, so that with a coating weight reduced by 25 percent, equally high adhesive strength values are measured as in the case of suspensions according to the state of the art. With the incorporation of suitable phthalate plasticizers, e.g. benzyl butyl phthalate, coatings are obtained with polyamide dispersions which are distinguished by a particularly rapid fixation at low temperatures. In spite of this, the penetration of the heat sealing adhesive through the insert or the cover fabric, which is a troublesome phenomenon in many coatings, is avoided.

Examples of the overall combination of aminoamide/acid salt of the aminoamide/synthetic resin powder include:

3-dimethylaminopropylstearoylamide/acetic acid salts of 3-dimethyluminopropylstearoylamide/copolyamide powder of nylon 6, nylon 6-6, nylon 12; 3-dimethylaminopropylamide of tall oil fatty acid/acetic acid salts of 3-dimethylaminopropylamide of tall oil fatty acid/copolyamide powder of nylon 6, nylon 6-6, nylon 12; 3-dimethylaminopropylpalmitoylamide/acetic acid salts of 3-dimethylaminopropylpalmitoylamide/copolyamide powder of nylon 6, nylon 6-6, nylon 12; 3-dimethylaminopropylamide of linseed oil fatty acid/acetic acid salts of 3-dimethylaminopropylamide of linseed oil fatty acid/copolyamide powder of nylon 6, nylon 6-6, nylon 12; 3-dimethylaminopropylamide of a mixture of stearic acid and palmitic acid/acetic acid salts of 3-dimethylaminopropylamide of a mixture of stearic acid and palmitic acid/copolyamide powder of nylon 6, nylon 6-6, nylon 12; other especially useful synthetic resin powders include, low pressure polyethylene powder; copolyamide powder of nylon 12, nylon 6-12, nylon 6; copolyamide powder of nylon 6, nylon 12, nylon of adipic acid and a mixture of hexamethylene diamine and isophorone diamine or trimethylhexamethylendiamine or a mixture of said diamines; copolyamide powder of nylon 12, nylon 11, nylon 6-6, nylon 6; copolyamide powder of nylon 12, nylon 6-6, nylon 6-12, nylon 6; copolyamide powder of nylon 6, nylon 6-6, nylon 12-6; copolyamide powder of nylon 12, nylon 6-6, nylon 6, nylon 6-10.

The copolyamides of the present invention include a terpolyamide of lauryl lactam, hexamethylene adipamide and caprolactam; a terpolyamide of lauryl lactam, dodecamethylene adipamide and caprolactam; a terpolyamide of caprolactam, hexamethylene adipamide and dodecamethylene adipamide; a terpolyamide of caprolactam, hexamethylene dodecamide and lauryl lactam; and terpolyamide of lauryl lactam, caprolactam, and X-adipic acid wherein X is isophoronediamine, trimethylhexamethylenediamine or mixtures thereof. The copolyamides also include lactam, a terpolyamide of lauryl lactam hexamethylene adipamide, and caprolactam; a terpolyamide of lauryl lactam, dodecamethylene adipamide and caprolactam; a terpolyamide of caprolactam, hexamethylene adipamide and dodecamethylene adipamide; a terpolyamide of caprolactam, hexamethylene dodecamide and lauryl lactam; and a terpolyamide of lauryl lactam, caprolactam and X-adipic acid wherein X is isophoronoediamine, trimethylhexamethylenediamine and mixtures thereof.

The following examples will describe the preparation of the suspension agents.

METHOD A 580 g. of glycerin and 1450 g. of water are heated together with 626 g. (1.7 moles) of 3-dimethylaminopropylstearoylamide (produced from industrial grade stearic acid and N,N-dimethyl-1,3-diaminopropane) to 50° C. unitl a homogeneous melt has been formed. This melt is then neutralized with 103 g. of acetic acid. Subsequently, another 344 g. (0.93 mole) of 3-dimethylaminopropylstearoylamide is stirred into the melt.

In a parallel process, 264 g. of hydroxyethylcellulose (cellulose with 2.5 moles of ethylene oxide) is dissolved in 18 liter of water. The still warm melt is then stirred into this solution.

METHOD B 580 g. of glycerin and 1450 g. of water are heated together with 626 g. (1.7 moles) of 3-dimethylaminopropylstearoylamide (produced from industrial grade stearic acid and N,N-dimethyl-1,3-diaminopropane) to 50° C. until a homogeneous melt has been formed. This melt is then neutralized with 103 g. of acetic acid. Thereafter, another 344 g. (0.93 mole) of 3-dimethylaminopropylstearoylamide is stirred into the melt. The still warm melt is dissolved in 18 liter of water.

The following examples show the improved results on printable pastes produced with the aid of the suspension agents according to the present invention.

EXAMPLE 1

Two kilograms of the suspension agent prepared according to Method A is diluted with 100 ml. of water. Thereafter, 1 kg. of a ground ternary copolyamide powder 6/6–6/12, m.p. 105° C., particle size <70μ, is stirred into the mixture. The paste obtained in this way after a few minutes is just barely free flowing and can be readily processed on a screen printing machine. An insert mat (nonwoven fabric, fleece) is coated. By means of a 15 mesh roller, a coating weight is obtained of 16 g/m². The mat is bonded to a cotton cover fabric at 140° C. and a pressure of 400 p/cm² for 13 seconds. During a tearing experiment with strips having a width of 5 cm, the mat is split off.

EXAMPLE 2

Two kilograms of the suspension agent prepared according to Method A is combined with 100 g. of benzylbutylphthalate. One kilogram of a ground copolyamide powder 6/6–6/12, m.p. 118° C., particle size <70μ, is stirred into this mixture. The thus-obtained paste is readily processed on a screen printing machine.

A one-ply insert fabric of a polyester-cotton blend is coated. By means of a 15 mesh roller, a coating weight is attained of 20 g/m². When fixed onto a cotton cover fabric under the conditions of 140° C. 400 p./cm², and 8 seconds and 140° C., 400 p./cm², and 15 seconds, respectively, the tear values of 2700 p. 5 cm and 3000 p./5 cm are obtained, respectively.

EXAMPLE 3

One kilogram of a ground ternary copolyamide 6/6–12/12, m.p. 101° C., having a particle size of <100μ, is stirred into 2 kg. of the suspension agent prepared according to Method A. The paste showed the correct viscosity of 2000 cp. (measured with a viscosimeter of the TV-type system MS-r4, Contraves, Zuerich) for processing in accordance with the screen printing procedure.

EXAMPLE 4

3350 g. of the suspension agent produced according to Method B is mixed with 195 g. of benzyl butyl phthalate and 30 g. of a defrother. 1920 g. of a commercial ternary copolyamide 6/6–6/12, m.p. 105° C. particle size $<70\mu$, is dispersed in this reaction mixture. Thereafter, 20 g. of hydroxyethylcellulose with 2.5 moles of ethylene oxide is added thereto under agitation, and the mixture is stirred for another 15 minutes. After allowing the paste to stand for one hour, it could be processed. The results correspond to those of the above examples.

EXAMPLE 5

One kilogram of low pressure polyethylene powder (density 0.95 g./cm$^3$, MFI (melt flow index) 190/5=28 g./10 min.) particle size $<70\mu$, is stirred into 2 kg. of the suspension agent prepared according to Method A. The paste can be utilized very well for the coating of insert materials. When processed with a 24 mesh roller, a coating weight is attained of 30 g./m$^2$. The subsequent fixation step results, when bonded to shirt poplin, in adhesion values of 2000 p./5 cm. The bonded fabrics have a very soft handle.

EXAMPLE 6

The procedure of Example 5 is followed, except that Method B is employed. The coating and adhesion results were identical to those of Example 5. The printability of the paste was somewhat better than that of Example 4, since no residues were scraped off from the outside of the screen printing roll.

EXAMPLE 7

86.5 g. of 3-dimethylaminopropylstearoylamide, 8.5 g. of acetic acid, 90 g. of glycerin, and 250 g. of stearyl alcohol alkoxylate with 5 ether groups are dispersed at 50° C. in 2900 g. of water. Under agitation, there are added first 195 g. of dibutylphthalate and 30 g. of defrother ("NOPCO" 8034) and then 1920 g. of a ternary copolyamide of laurollactam, caprolactam, and the salts of adipic acid with trimethylhexamethylenediamine and isophoronediamine, m.p. 123° C., suitable for textile bonding. The paste is transferred according to the screen printing method by means of a 15 mesh roller onto an insert fabric. The coating weight is 20 g./m$^2$ after removing the water by evaporation. The results of the bonding tests correspond to those of Examples 1–4.

EXAMPLE 8

The procedure of Examples 7 is followed. In place of the polyamide, the same amount of low pressure polyethylene powder (density 0.95 g./cm$^3$, MFI 190/5-28 g./10 min.), particle size $<70\mu$ is incorporated into the mixture under agitation. In coating tests with a 24 mesh roller, coating weight is attained of 30 g./m$^2$. The bonding values with respect to shirt poplin is 2000 p./5 cm.

EXAMPLE 9

100 g. (0.27 mole) of 3-dimethylaminopropylstearoylamide is dispersed in 2900 g. of water and combined with 1.06 g. (0.014 mole) of acetic acid, 80 percent strength. This mixture is combined under agitation with 2000 g. of a ternary copolyamide powder according to Example 1, particle size $<70\mu$. The paste is readily processed on a screen printing machine, equipped with a 15 mesh roller.

EXAMPLE 10

3200 g. of water is combined under stirring first with 100 g. (0.27 mole) of 3-dimethylaminopropylstearoylamide, 200 g. of benzyl butyl phthalate, 100 g. of glycerin, and 30 g. of defrother (NOPCO 8034) and then with 2000 g. of the ternary copolyamide (according to Example 1), particle size $<80\mu$. Thereafter, the desired viscosity is set with the aid of 85 ml. of a 1 percent strength acetic acid (0.014 mole). The paste is very easily processed on a screen printing machine, equipped with a 15 mesh roller. With a coating weight of 18 g./m$^2$, adhesion values of 2500 p./5 cm. are attained when bonded to polyester cotton fabric. The textile handle is very soft, a penetration of the adhesive through the insert or cover material is not observed.

EXAMPLE 11

The procedure of Example 10 above is followed, except that low pressure polyethylene powder is employed in place of polyamide. When executing the coating step with a 24 mesh roller, coating weights are obtained of 32 g./m$^2$. The adhesion values were greater than 2000 p./5 cm.

EXAMPLE 12

2000 g. of stearylpolyglycol ether with, on the average, 6 ether groups, 720 g. of 3-dimethylaminopropylstearoylamide, 80 g. of acetic acid, and 200 g. of defrother are emulsified in 21,000 g. of water. Under agitation, this mixture is combined with 12,000 g. of low pressure polyethylene (denisty 0.95 g./cm$^3$, MFI 190/5=23 g./10 min.), particle size $<80\mu$. The paste is processed over a long period of time on a screen printing machine, equipped with a 30 mesh roller, without having to scrape off residues from the outside of the roller. The coating weight on shirt insert fabric is 31 g./m$^2$. When bonded to shirt poplin, adhesion values are achieved which are greater than 2000 p./5 cm.

EXAMPLE 13

Analogously to Example 12, a paste is produced with a commercial polyamide 6/6–6/12 (m.p. 103° C.), particle size $<80\mu$, and processed by means of a 15 mesh roller. The printing characteristic corresponds to Example 12. A polyester-cotton fabric blend is coated. The coating weight is 32 g./m$^2$. When bonded as set forth in Example 1 (15 seconds, 140° C. 400 p./cm$^2$), tearing values are obtained of 2500–3000 p./5 cm.

EXAMPLE 14

470 g. of 3-aminopropylstearoylamide, 55 g. of acetic acid, 1800 g. of stearyl polyglycol ether, 560 g. of glycerin, 19,500 g. of water, and 190 g. of defrother are processed into an emulsion. In this emulsion are dispersed 2215 g. of benzyl butyl phthalate and 12,300 g. of polyamide 6/6–6/12, m.p. 103° C. The paste is processed without difficulty as set forth in Example 13. Under the bonding conditions 140° C. 400 p./cm$^2$, 8 seconds, tearing values of 3000 p./5 cm are attained.

We claim:

1. A method of spot coating garment interlinings comprising preparing an aqueous dispersion wherein there is contained:

I. a suspension agent in a concentration of about 1–7.5 percent by weight comprising a mixture of
 (a) about 95–40 molar percent of an aminoamide of the general formula

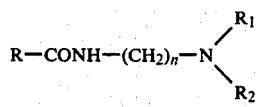

wherein
R represents a saturated or unsaturated hydrocarbon group having 13-19 carbon atoms,
n represents an integer of between 2 and 6, and
$R_1$ and $R_2$ represent alkyl groups having 1-3 carbon atoms; and
(b) about 5-60 molar percent of an acid salt of said aminoamide; and
II. a concentration of about 25-50 percent by weight synthetic resin powders having melting points not more than about 140° C.; and
spot coating said garment interlinings with said aqueous dispersion.

2. The method of claim 1, comprising said aqueous emulsion comprising a solution containing the mixture of aminoamide and salt of aminoamide in a concentration of about 2-5 percent by weight.

3. The method of claim 1, wherein said mixture comprises
(A) about 85-95 molar percent of the aminoamide and
(B) about 5-15 molar percent of the fatty acid salt of the aminoamide.

4. The method of claim 1, wherein said mixture comprises
(A) about 40-60 molar percent of the aminoamide, and
(B) about 60-40 molar percent of the fatty acid salt of the aminoamide.

5. The method of claim 4, further comprising about 7-10 percent by weight of an alkyl polyglycol ether of the general formula

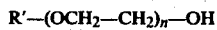

$$R'-(OCH_2-CH_2)_n-OH$$

wherein
R' represents a fatty alcohol group having 14-20 carbon atoms, and
n represents an integer from 4 to 10.

6. The method of claim 4, further comprisisng about 0.5-3 percent by weight of a hydroxyethylcellulose obtained by the reaction of cellulose with 2-3 moles of ethylene oxide.

7. The method of claim 1, wherein said synthetic resin powders are selected from the group consisting of polyvinyl resins and polyamide resins.

8. The method of claim 7, wherein said polyvinyl resins are polyethylene.

9. The method of claim 7, wherein said polyamide resins are copolyamides.

10. The method of claim 9, wherein said copolyamides are aliphatic dicarboxylic acids, cyclic dicarboxylic acids each having 4-12 carbon atoms or mixtures thereof or said dicarboxylic acids and an equivalent amount of aliphatic diamine, cyclic diamine each having 4-15 carbon atoms or mixtures thereof or aminocarboxylic acids having 4-16 carbon atoms of mixtures thereof.

11. The method of claim 7, wherein said copolyamide resins are selected from the group consisting of a terpolyamide of lauryl lactam, hexamethylene adipamide and caprolactam; a terpolyamide of lauryl lactam, dodecamethylene adipamide and caprolactam; a terpolyamide of caprolactam, hexamethylene adipamide and dodecamethylene adipamide; a terpolyamide of caprolactam, hexamethylene dodecamide and lauryl lactam; and terpolyamide of lauryl lactam, caprolactam, and X-adipic acid where X is selected from the group consisting of isophoronediamine, trimethylhexamethylenediamine and mixtures thereof.

12. The method of claim 1, wherein the concentration of I is about 2-5 percent by weight and the concentration of II is about 30-40 percent by weight.

* * * * *